July 3, 1923.
J. T. WELCH
FISHING REEL
Filed May 23, 1921
1,460,994
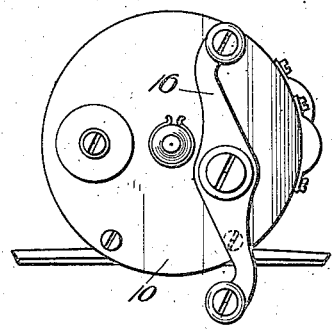
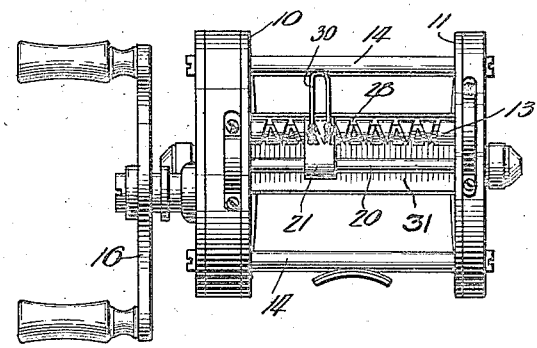
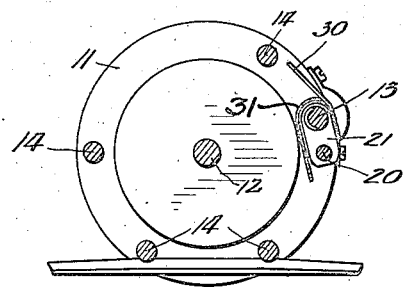
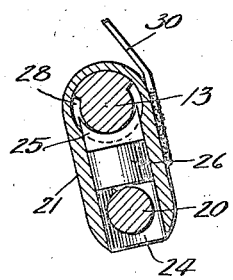
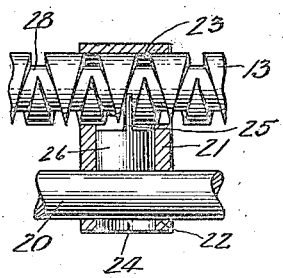
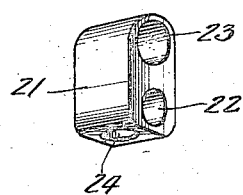
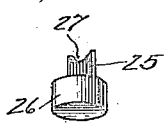
Inventor:
John T. Welch Patented July 3, 1923.

1,460,994

UNITED STATES PATENT OFFICE.

JOHN T. WELCH, OF DOWAGIAC, MICHIGAN, ASSIGNOR TO JAMES HEDDON'S SONS, OF DOWAGIAC, MICHIGAN, A CORPORATION OF MICHIGAN.

FISHING REEL.

Application filed May 23, 1921. Serial No. 471,813.

*To all whom it may concern:*

Be it known that I, JOHN T. WELCH, a citizen of the United States, residing at Dowagiac, in the county of Cass and State of Michigan, have invented certain new and useful Improvements in Fishing Reels, of which the following is a specification.

This invention relates to a fishing reel with which is combined a level winding mechanism, and is concerned with certain improved features of construction by which the parts are protected against undue wear and liability to disorder.

An exemplification of this invention is shown in the accompanying drawing in the manner following.

Figure 1 is an end elevation of a fishing reel;

Fig. 2 is a side elevation thereof;

Fig. 3 is a transverse section therethrough taken on line 3—3 of Fig. 2;

Fig. 4 is an enlarged detail in section taken through the line guide carriage;

Fig. 5 is a similar view, the plane of the section being at right angles to that of Fig. 4; and Figs. 6 and 7 are views in perspective of the carriage and pawl respectively, detached from their associated parts.

The principal parts of my reel include a pair of spaced head plates 10 and 11 between which are spool and traversing shafts 12 and 13 respectively, as well as the usual pillars 14. These elements the head plates and connecting pillars constitute the reel frame to which are secured the various operating parts. Associated with each head plate is a chamber within which may be arranged driving connections to which motion is imparted as through the medium of a crank 16.

Extending between the head plates adjacent the traversing shaft is a slide rod or bar 20 on which is mounted a carriage 21 whose construction is best shown in Fig. 6. Formed transversely through the carriage body, which is relatively solid, are two cylindrical openings 22 and 23, the former being adapted to receive the bar 20 and the latter the traversing shaft, and extending from one end of the carriage through the bore 22 to communicate with the bore 23 is a third opening in the form of a socket designated as 24.

The carriage is of sufficient width in the direction of its movement to be steadied by the bar 20 against rocking such as tends to occur with reciprocation lengthwise of the reel. The means for effecting such reciprocation includes a pawl (see Fig. 7) which includes a flattened head 25 carried by a cylindrical body 26 which is fitted into the socket 24 within the carriage, the body diameter and head length being about the same, so that the pawl may be introduced into place through the outer socket end. The engaging face of the head designated as 27, is curved in conformity with the traversing shaft in which are formed reversing threads 28 adapted to co-operate with the pawl to reciprocate the carriage from one end of the reel to the other. Mounted on the front or outer side of the carriage is a line guide 30 which may be conveniently formed of a looped wire, permitting the line on the reel to pass therethrough. A housing 31 is also shown as extending over the traversing shaft and slide rod, being arranged at the rear or inner side thereof with its top portion in overhanging relation thereto.

The construction which I have described is exceedingly simple to manufacture and assemble. The pawl is introduced into the socket 24 through its outer end, and the carriage is then mounted on the traversing shaft and steady bar. The operative relation of these several parts is now permanent, and, in consequence, the rotary movements of the traversing shaft, through the medium of its reversely formed threads and the pawl will act to reciprocate the carriage at a constant speed from one end of the reel to the other, the pawl shifting its angle at the end of its stroke to align with the reversely inclined threads, as required. The pawl when mounted in the carriage in the manner described, is held lightly but positively against the traversing shaft, its body resting upon the steady bar and being free to turn in the opening 24 as required to align its head with the threads. Lateral thrusts upon the carriage, due to the tractive forces thereon exerted by the traversing shaft, are compensated for by the ample bearing surface presented by the carriage to the steady bar, and in adition to thus providing wearing surfaces of ample dimensions to resist undue wear, the steady bar maintains the carriage in a fixed angular relation to the remaining parts of the reel such that the line guide 30 is held against any tendency to turn with the traversing shaft. By preference I form the carriage, pawl, and steady bar of hardened tool steel so as to better adapt them to durable operation.

I claim:

1. In a fishing reel, the combination of a spool shaft, a rotatable traversing shaft, a hollow carriage through which the traversing shaft extends, an element loosely positioned within the carriage providing a driving connection between the traversing shaft and the carriage, and means for retaining said element operatively in place comprising a bar engaging therewith and with the carriage in a manner to steady the latter during its travel lengthwise of the reel, substantially as described.

2. In a fishing reel, the combination of a spool shaft, a line guide carriage, a mounting on which the carriage may be reciprocated, there being an opening extending through the carriage from one of its faces to its mounting, an element within said opening bearing on said mounting, and means for reciprocating the carriage having a driving connection both with said element and with the spool shaft, substantially as described.

3. In a fishing reel, the combination of a spool shaft, a traversing shaft, a carriage mounted to reciprocate lengthwise of the traversing shaft, a driving connection between the carriage and the traversing shaft, and means for maintaining said connection operative adapted also to guide the carriage in its travel, substantially as described.

4. In a fishing reel, the combination of a spool shaft, a traversing shaft, a steady bar, a carriage mounted to reciprocate upon the steady bar, and means mounted in the carriage and retained therein by the steady bar adapted to engage with the traversing shaft to form a driving connection between the carriage and traversing shaft, substantially as described.

5. In a fishing reel, the combination of a spool shaft, a traversing shaft, a steady bar adjacent the traversing shaft, a carriage mounted to move on the steady bar in a longitudinal direction only, there being an opening in the carriage extending from the steady bar to the traversing shaft, and a driving connection between the traversing shaft and carriage removably positioned in said opening and bearing both against the steady bar and traversing shaft, substantially as described.

6. In a fishing reel, the combination of a spool shaft, a traversing shaft, a steady bar, and a carriage having spaced openings through which pass, respectively, the traversing shaft and steady bar to provide a mounting for the carriage, there being a third opening within the carriage connecting the other two, and means within said third opening engaging both with the steady bar and with the traversing shaft to provide a driving connection from the latter to the carriage, substantially as described.

7. In a fishing reel, the combination with a spool, of a line guide therefor comprising a pawl, a traversing shaft, and a steady bar in spaced relation, each adapted to engage with the pawl, the former acting to reciprocate the pawl lengthwise of the spool, and a mounting for the pawl consisting of a traveling carriage having a line guide thereon, the carriage acting to hold the pawl against displacement relative to the traversing shaft and steady bar, substantially as described.

JACK T. WELCH.

Witness:
L. J. WOOSTER.